United States Patent Office 2,924,561
Patented Feb. 9, 1960

2,924,561

POLYMERIZATION OF UNSATURATED ORGANIC COMPOUNDS

Louis Schmerling, Riverside, Ill., assignor, by mesne assignments, to Universal Oil Products Company, Des Plaines, Ill., a corporation of Delaware No Drawing. Application October 25, 1956
Serial No. 618,191

16 Claims. (Cl. 204—162)

This invention relates to a method for polymerizing unsaturated organic compounds and more particularly to a process for polymerizing olefinic hydrocarbons.

It is an object of this invention to provide a novel method for polymerizing unsaturated organic compounds.

A further object of this invention is to provide a novel method for polymerizing alkenes and cycloalkenes by treating said alkenes and cycloalkenes in the presence of a solid catalyst and ultraviolet light.

One embodiment of this invention resides in a process for the polymerization of unsaturated organic compounds which comprises heating said compounds in the presence of a metallic oxide and ultraviolet light, and recovering the resultant polymerized compound.

A further embodiment of the invention is found in a process for the polymerization of an alkene which comprises heating said alkene to a temperature in the range of from about 30° to about 350° C. in the presence of a metallic oxide and ultraviolet light of from about 2000 to about 3500 A., and recovering the resultant polymerized alkene.

Yet another embodiment of the invention is found in a process for the polymerization of an unsaturated organic compound which comprises heating said compound to a temperature in the range of from about 30° to about 350° C. in the presence of an inert organic diluent, a metallic oxide and ultraviolet light of from about 2000 to about 3500 A., and recovering the resultant polymerized compound.

A specific embodiment of the invention resides in a process for polymerizing propene which comprises heating said propene to a temperature in the range of from about 30° to about 350° C. in the presence of zinc oxide and ultraviolet light of from about 2000 to about 3500 A., and recovering the resultant polymerized propene.

Other objects and embodiments referring to alternative alkenes and cycloalkenes and to alternative metallic oxide catalysts will be found in the following further detailed description of the invention.

Heretofore, the usual methods of polymerizing unsaturated organic compounds such as olefins or cycloolefins was to heat said compounds in the presence of a peroxide or of an acid-acting catalyst either of the solid or liquid type, such catalysts including sulfuric acid, aluminum chloride, boron fluoride, phosphoric acid, phosphoric acid composited on a solid siliceous adsorbent, etc. However, it is now proposed that according to the present process the unsaturated organic compounds be polymerized by heating said compounds in the presence of a metallic oxide catalyst which is subjected to irradiation by ultraviolet light of from about 2000 to about 3500 Angstrom units.

Polymerized organic compounds which are prepared according to the process of this invention find a wide variety of uses in the chemical and allied fields. Normally gaseous alkenes such as propene and the butenes are polymerized for use in motor fields. Another gaseous olefin, ethylene, when polymerized to solid form as polyethylene is important commercially as a plastic. Styrene, a liquid, can also be polymerized to form polystyrene, a well known plastic. Other olefins may also undergo polymerization to form resins or plastics which find commercial use in many ways.

Unsaturated organic compounds which may be polymerized according to the process of this invention include alkenes and preferably 1-alkenes such as ethylene, propene, butene-1, pentene-1, hexene-1, heptene-1, etc.; cycloalkenes such as cyclopentene, cyclohexene, cycloheptene, etc.; aryl alkenes such as styrene, allylbenzene, etc. The polymerization of the aforesaid unsaturated organic compounds is carried out by passing said compound over a metallic oxide catalyst at a temperature in the range of from about 30° to about 350° C. under ultraviolet light irradiation. If so desired, the olefins may be passed over the catalyst as such or, in the presence of a substantially inert organic diluent such as a paraffin, a cycloparaffin or an aromatic hydrocarbon, examples of said diluents including pentane, hexane, heptane, etc., cyclohexane, methylcyclohexane, etc., benzene, toluene, xylene, etc.

The catalyst which is to be used in the process of this invention is a metallic oxide, the preferred oxides being those which absorb strongly in the ultraviolet region and include zinc oxide, cadmium oxide, titanium dioxide, zirconium dioxide, antimony trioxide, arsenic trioxide, etc. It is contemplated within the scope of this invention that the catalyst may be activated before use by irradiating said catalyst in ultraviolet light in the presence of water or certain hydroxy substituted organic compounds such as ethylene glycol, propylene glycol, phenol, resorcinol, hydroquinone, methyl alcohol, ethyl alcohol, propyl alcohol, etc.

The process of this invention may be effected in any suitable manner and may comprise either a batch or a continuous type operation. For example, when a batch type operation is used a quantity of the unsaturated organic compound, if in liquid form, is placed in an appropriate condensation apparatus provided with heating and stirring means, along with the particular metallic oxide which has been selected as the catalyst. A source of ultraviolet light is placed adjacent the apparatus (fitted with a window which transmits ultraviolet light) so that the light emanating from said source will irradiate the catalyst and unsaturated organic compound. The flask is heated to the desired temperature and maintained thereat for a predetermined residence time, at the end of which time the flask and contents thereof are cooled to room temperature and the polymerized material is separated from any unreacted starting materials. If the unsaturated organic compound is in gaseous form a quantity of the catalyst is placed in an appropriate apparatus such as an autoclave containing an ultraviolet source, the autoclave is sealed and the unsaturated compound is pressured in, the reaction being continued for a predetermined period of time, at the end of which time the autoclave and contents are cooled, the excess pressure is vented and the polymerized compound is recovered.

Another method of effecting the process of the present invention is a continuous type operation. In this type the unsaturated organic compound is continuously passed through a suitable reaction tube (for example a quartz tube) containing the metal oxide catalyst and irradiated with ultraviolet and maintained at the desired temperature. The tube may be held in horizontal position and contain a layer of catalyst which is heated and irradiated while the unsaturated compound is passed over it. The reaction product comprising the polymerized compound is continuously withdrawn and purified by conventional means while any unreacted starting materials may be recycled to form a portion of the feed stock. One particular type of continuous operation comprises a fixed bed method in which the catalyst is disposed as a fixed bed in the reactor and the polymerizable unsaturated organic compound is passed therethrough in either an upward or downward or horizontal flow. Another type of operation which may be used is the fluidized type in which the catalyst and the unsaturated organic compound are maintained in a state of turbulence under hindered settling conditions. Yet another type of operation comprises the slurry type in which the catalyst is carried into the reactor as a slurry in the polymerizable organic compound. As hereinbefore set forth, the catalyst is irradiated by the ultraviolet light while passing through the reactor. In all cases the reaction product is separated from the reactor effluent while the unreacted starting materials are recycled to form a portion of the feed stock.

The following examples are given to illustrate the process of the present invention which, however, are not intended to limit the generally broad scope of the present invention in strict accordance therewith.

*Example I*

35 g. of zinc oxide which have been previously irradiated by exposure to the rays of an ultraviolet light source are placed in a quartz tube which is irradiated by means of an ultraviolet lamp at a distance of two inches. The oxide is heated at 150° C. by means of an electrically heated wire coil inside the bed. Propylene is passed through the tube being irradiated at about 0.5–1.0 liquid hourly space velocity and the product is cooled to room temperature, the excess propylene vented and the reaction product comprising polymerized propylene is recovered.

*Example II*

40 g. of a catalyst comprising titanium dioxide is placed in an autoclave fitted with an internal ultraviolet lamp. The autoclave is sealed and butene-1 is pressured in until a pressure of approximately 35 atmospheres has been reached, while irradiating and heating the autoclave to a temperature of about 150° C. and maintaining thereat for a period of about two hours. At the end of this time the autoclave and contents thereof are cooled to room temperature, the excess butene-1 vented and the reaction product, comprising the polymerized butene-1, is recovered therefrom.

*Example III*

35 g. of a catalyst comprising antimony trioxide previously irradiated by ultraviolet light is placed in the reactor described in Example I and cyclohexene is passed dropwise over the catalyst heated to 200° C. while irradiating with an ultraviolet lamp. The product is cooled to room temperature and then is fractionated to separate the unreacted cyclohexene from the cyclohexene polymer.

I claim as my invention:

1. A process for the polymerization of an unsaturated organic compound which comprises heating said compound in the presence of a metal oxide selected from the group consisting of zinc oxide, cadmium oxide, titanium dioxide, zirconium dioxide, antimony trioxide and arsenic trioxide irradiated with ultraviolet light during the polymerization, and recovering the resultant polymerized compound.

2. A process for the polymerization of an unsaturated organic compound which comprises heating said compound to a temperature in the range of from about 30° to about 350° C. in the presence of a metal oxide selected from the group consisting of zinc oxide, cadmium oxide, titanium dioxide, zirconium dioxide, antimony trioxide and arsenic trioxide irradiated with ultraviolet light during the polymerization, and recovering the resultant polymerized compound.

3. A process for the polymerization of an unsaturated hydrocarbon which comprises heating said hydrocarbon to a temperature in the range of from about 30° to about 350° C. in the presence of a metal oxide selected from the group consisting of zinc oxide, cadmium oxide, titanium dioxide, zirconium dioxide, antimony trioxide and arsenic trioxide irradiated with ultraviolet light of from about 2000 to about 3500 A. during the polymerization, and recovering the resultant polymerized compound.

4. A process for the polymerization of an alkene which comprises heating said alkene to a temperature in the range of from about 30° to about 350° C. in the presence of a metal oxide selected from the group consisting of zinc oxide, cadmium oxide, titanium dioxide, zirconium dioxide, antimony trioxide and arsenic trioxide irradiated with ultraviolet light of from about 2000 to about 3500 A. during the polymerization, and recovering the resultant polymerized alkene.

5. A process for the polymerization of a cycloalkene which comprises heating said cycloalkene to a temperature in the range of from about 30° to about 350° C. in the presence of a metal oxide selected from the group consisting of zinc oxide, cadmium oxide, titanium dioxide, zirconium dioxide, antimony trioxide and arsenic trioxide irradiated with ultraviolet light of from about 2000 to about 3500 A., during the polymerization, and recovering the resultant polymerized cycloalkene.

6. A process for the polymerization of an alkene which comprises heating said alkene to a temperature in the range of from about 30° to about 350° C. in the presence of zinc oxide irradiated with ultraviolet light of from about 2000 to about 3500 A., and recovering the resultant polymerized alkene.

7. A process for the polymerization of an alkene which comprises heating said alkene to a temperature in the range of from about 30° to about 350° C. in the presence of titanium dioxide irradiated with ultraviolet light of from about 2000 to about 3500 A. during the polymerization, and recovering the resultant polymerized alkene.

8. A process for the polymerization of an alkene which comprises heating said alkene to a temperature in the range of from about 30° to about 350° C. in the presence of antimony trioxide irradiated with ultraviolet light of from about 2000 to about 3500 A. during the polymerization, and recovering the resultant polymerized alkene.

9. A process for the polymerization of propene which comprises heating said propene to a temperature in the range of from about 30° to about 350° C. in the presence of zinc oxide irradiated with ultraviolet light of from about 2000 to about 3500 A. during the polymerization, and recovering the resultant polymerized propene.

10. A process for the polymerization of butene-1 which comprises heating said butene-1 to a temperature in the range of from about 30° to about 350° C. in the presence of zinc oxide irradiated with ultraviolet light of from about 2000 to about 3500 A. during the polymerization, and recovering the resultant polymerized butene-1.

11. A process for the polymerization of cyclohexene which comprises heating said cyclohexene to a temperature in the range of from about 30° to about 350° C. in the presence of zinc oxide irradiated with ultraviolet light of from about 2000 to about 3500 A. during the polymerization, and recovering the resultant polymerized cyclohexene.

12. A process for the polymerization of an unsaturated organic compound which comprises heating said compound to a temperature in the range of from about 30° to about 350° C. in the presence of an inert organic diluent and a metal oxide selected from the group consisting of zinc oxide, cadmium oxide, titanium dioxide, zirconium dioxide, antimony trioxide and arsenic trioxide irradiated with ultraviolet light of from about 2000 to about 3500 A. during the polymerization, and recovering the resultant polymerized compound.

13. A process for the polymerization of an unsaturated organic compound which comprises heating said compound to a temperature in the range of from about 30° to about 350° C. in the presence of a paraffin and a metal oxide selected from the group consisting of zinc oxide, cadmium oxide, titanium dioxide, zirconium dioxide, antimony trioxide and arsenic trioxide irradiated with ultraviolet light of from about 2000 to about 3500 A. during the polymerization, and recovering the resultant polymerized compound.

14. A process for the polymerization of an unsaturated organic compound which comprises heating said compound to a temperature in the range of from about 30° to about 350° C. in the presence of an aromatic diluent and a metal oxide selected from the group consisting of zinc oxide, cadmium oxide, titanium dioxide, zirconium dioxide, antimony trioxide and arsenic trioxide irradiated with ultraviolet light of from about 2000 to about 3500 A. during the polymerization, and recovering the resultant polymerized compound.

15. A process for the polymerization of an unsaturated organic compound which comprises heating said compound to a temperature in the range of from about 30° to about 350° C. in the presence of a cycloparaffin and a metal oxide selected from the group consisting of zinc oxide, cadmium oxide, titanium dioxide, zirconium dioxide, antimony trioxide and arsenic trioxide irradiated with ultraviolet light of from about 2000 to about 3500 A. during the polymerization, and recovering the resultant polymerized compound.

16. A process for the polymerization of propene which comprises heating said propene to a temperature in the range of from about 30° to about 350° C. in the presence of pentane and zinc oxide irradiated with ultraviolet light of from about 2000 to about 3500 A. during the polymerization, and recovering the resultant polymerized propene.

References Cited in the file of this patent

UNITED STATES PATENTS

| 1,241,738 | Klatte et al. | Oct. 2, 1917 |
| 2,213,423 | Wiezevich | Sept. 3, 1940 |

FOREIGN PATENTS

| 282,096 | Switzerland | July 16, 1952 |

OTHER REFERENCES

Chemical and Engineering News, vol. 33 (April 1955), pp. 1424, 1425 and 1428.